A. Bishop,

Sausage Stuffer.

No. 106,250.　　　　　Patented Aug. 9, 1870.

Witnesses
Edw. M. Cropley
C. L. Everett

Inventor
Abner Bishop
per Alexander V. Mason
Attys.

United States Patent Office.

ABNER BISHOP, OF SMITHVILLE, OHIO.

Letters Patent No. 106,250, dated August 9, 1870; antedated August 3, 1870.

IMPROVED SAUSAGE-STUFFER AND LARD-PRESS.

The Schedule referred to in these Letters Patent and making part of the same.

*To all whom it may concern:*

Be it known that I, ABNER BISHOP, of Smithville, in the county of Wayne and in the State of Ohio, have invented certain new and useful Improvements in Combined Sausage-Stuffer and Lard-Press; and I do hereby declare that the following is a full, clear, and exact description thereof, reference being had to the accompanying drawing and to the letters of reference marked thereon making a part of this specification.

The nature of my invention consists in the construction and arrangement of a "combined sausage-stuffer and lard-press," as will be hereinafter fully set forth.

In order to enable others skilled in the art to which my invention appertains to make and use the same, I will now proceed to describe its construction and operation, referring to the annexed drawing, in which—

Figure 3:
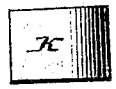
Figure 4:
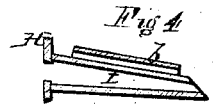

Figure 3 of the outer cylinder, forming the lard receptacle for pressing the same; and Figure 4 is a vertical section of the spout of the sausage-stuffer.

Figure 1:
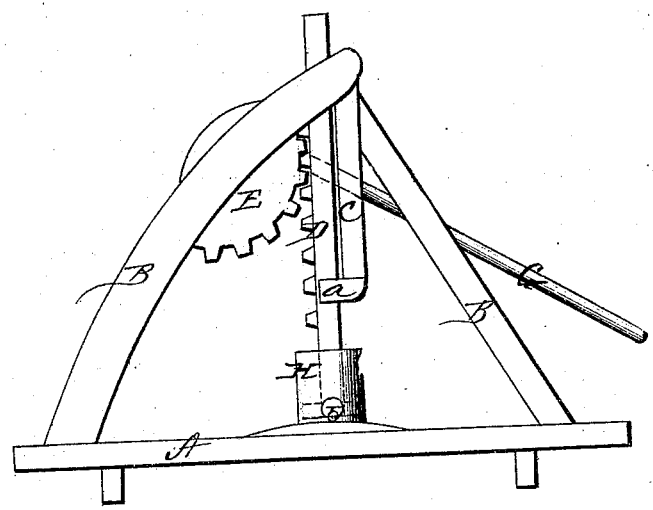
Figure 1 is a front elevation of my machine.
Figure 2:
Figure 2 is a side view of the inner.

A represents the bed-piece of my machine, having two inclined standards, B B, joined together at their upper ends, as shown in fig. 1.

From the point of connection of the two standards a vertical bar, C, extends downward a suitable distance.

This bar C is provided with suitable guides, $a$, between which moves perpendicularly a rack-bar, D, which is operated by means of a segment rack, E, pivoted to one of the inclined standards B, and which is provided with a lever, G, for turning the same.

The plunger being attached at the lower end of the rack-bar D, it obtains a perfectly perpendicular action instead of the usual side action, requiring less power to force the plunger down.

Upon the bed A, directly beneath the rack-bar D, is secured the hopper H, in such a manner that it can be readily removed by merely turning a bolt.

The stuffer H is provided with a spout, I, having an air-tube, $b$, on top, as shown in fig. 4.

The skin in which the meat is to be stuffed being tied over the end of the spout I and tube $b$, the air contained in the skin is allowed to pass out through said tube.

When it is desired to press lard with the same machine, the hopper H is removed, as above mentioned, and the cylinders J and K placed on the bed A, the inner cylinder J being perforated, and of suitable size for the plunger of the machine.

Having thus fully described my invention,

What I claim as new, and desire to secure by Letters Patent, is—

The combination and arrangement of the bed A, standards B B, bar C, rack-bar D, segment rack E, lever G, hopper H, spout I, and tube $b$, all substantially as and for the purposes herein set forth.

In testimony that I claim the foregoing, I have hereunto set my hand this 10th day of January, 1870.

ABNER BISHOP.

Witnesses:
DANIEL L. KIEFFER,
J. M. KIEFFER.